(12) United States Patent
Albiez

(10) Patent No.: US 6,240,737 B1
(45) Date of Patent: Jun. 5, 2001

(54) SOLAR-POWERED REFRIGERATOR

(75) Inventor: Robert Charles Albiez, 50 Grigor Street, Caloundra, Queensland, 4551 (AU)

(73) Assignees: Robert Charles Albiez; Margaret Emily Albiez, both of (AU)

( * ) Notice: Subject to any disclaimer, the term of this patent is extended or adjusted under 35 U.S.C. 154(b) by 0 days.

(21) Appl. No.: 09/604,804

(22) Filed: Jun. 28, 2000

Related U.S. Application Data

(63) Continuation of application No. PCT/AU99/00406, filed on May 27, 1999.

(51) Int. Cl.[7] ................................................ F25B 27/00
(52) U.S. Cl. ........................................ 62/228.5; 62/235.1
(58) Field of Search .............................. 62/235.1, 228.5

(56) References Cited

U.S. PATENT DOCUMENTS 4,367,633 * 1/1983 Strathman ........................... 62/235.1

FOREIGN PATENT DOCUMENTS

| 41 43 243 A1 | 7/1993 | (DE) . |
| 196 27 096 A1 | 1/1998 | (DE) . |
| 5-215434 * | 8/1993 | (JP) ................................. 62/235.1 |

OTHER PUBLICATIONS

Stephens et al., "Photovoltaic Systems For Cooling Applications", 1980, Third E.C. Photovoltaic Solar Energy Conference, Cannes, France, pp. 463–471.

NASA's Johnson Space Center, "Solar Heat Pump", NASA Contract NAS–97113.

* cited by examiner

Primary Examiner—William E. Tapolcai

(57) ABSTRACT

A solar-powered refrigerator which includes a switch operable to independently regulate supply of an electric current to one or more variable-speed compressors, each of the variable-speed compressors being in fluid communication with a respective coolant circuit in thermal communication with the interior of a cooling chamber.

15 Claims, 4 Drawing Sheets

SOLAR-POWERED REFRIGERATOR

REFERENCE TO RELATED APPLICATION

This application is a continuation of PCT Application Serial No. PCT/AU99/00406 filed May 27, 1999.

FIELD OF THE INVENTION

THIS INVENTION relates to a solar-powered refrigerator particularly suited for, but not limited to, use in remote locations.

BACKGROUND OF THE INVENTION

Refrigerators have become indispensable for the preservation of temperature-sensitive items such as food, drink, medicines, pharmaceuticals, vaccines and the like.

As defined herein, the term "refrigerator" includes refrigerators capable of cooling to temperatures below 4° C., and/or freezers which cool to −20° C. or below.

In simplest form, a refrigerator comprises a compressor in fluid communication with a coolant circuit (which includes a coolant such as R134a), the coolant circuit being in thermal communication with the interior of a cooling chamber, in which are stored items to be cooled or frozen.

The principle of operation is that the compressor pressurizes the coolant which circulates through the coolant circuit located in the walls of the cooling chamber, whereupon the coolant expands drawing heat from the cooling chamber and contents therein, resulting in cooling or freezing of the cooling chamber and contents.

The expanded coolant is then re-compressed and recirculated through the circuit. Usually, a thermostat is provided which assists maintenance of a desired temperature in the cooling chamber.

Typical refrigerator compressors are provided with induction motors which operate at a fixed speed with a fixed energy requirement, and as such are relatively wasteful in terms of energy consumption.

Recently, variable-speed compressors have been developed which can operate at variable speeds and hence with variable energy consumption, thereby providing enhanced energy efficiency. It will be appreciated that variable-speed compressor technology has progressed rapidly in recent years, such as may be found in International Application WO98/15790, Japanese Patent No. 10038439, Japanese Patent No. 9196535 and U.S. Pat. No. 5,711,159, for example. Of particular note are the TLV alternating current (AC) compressor and the BD35F and BD50F direct current (DC) compressors produced by Danfoss A/S.

Although in many cases refrigerators operate via mains powered AC electricity, an increasingly used alternative source of energy for refrigerators is solar energy. Usually, solar energy operation is achieved using solar panels which collect and convert incident solar radiation into electrical energy which is storable in batteries. When incident solar radiation is minimal, such as at night, early morning or late evening, or in overcast conditions, the batteries can be used to power the refrigerator compressor.

A disadvantage of this system is that typical refrigerator compressors require a threshold electrical current, often 5 Amps, to be operable. Thus, the refrigerator is only operable once the threshold current necessary to power the compressor has been reached.

A further disadvantage with such systems is that the current regulators between the solar panels and batteries are unreliable. If they fail, the batteries will either not be charged or be damaged by uncontrolled current input.

Also, existing solar-powered refrigerators are often not readily transportable. This creates a particular problem in remote regions where solar powered refrigeration is often used to prevent spoilage of medicines and vaccines. For example, it is common for vaccines to be transported from central storage locations to surrounding regions via couriers carrying vaccine containers equipped with freezer blocks A ready supply of these blocks must be maintained.

However, in conditions of low sunlight, it can be extremely difficult to maintain this supply as the typical solar-powered refrigerators used for this purpose become inoperable due to their requirement for a threshold current to be provided. Although batteries can provide power under conditions of low sunlight, they typically have the shortest lifespan of any of the components of the refrigeration system. Consequently, they tend to constitute the weakest "link" in the system. Furthermore, batteries can be stolen or otherwise become inoperable, and therefore require replacement. The high replacement costs and lack of ready availability of solar-chargeable batteries pose a particular problem in remote areas of poor countries.

OBJECT OF THE INVENTION

It is therefore an object of the invention to provide a solar-powered refrigerator with enhanced utilization of a variable supply of solar-generated electrical energy.

It is a further object of the invention to provide a solar-powered refrigerator which does not require a battery.

It is a preferred object of the invention to provide a solar-powered refrigerator which reduces the risk of refrigerated contents thawing and otherwise spoiling.

Other preferred embodiments will become apparent from the following description.

SUMMARY OF THE INVENTION

In a broad aspect, the present invention resides in a solar-powered refrigerator which includes:

(i) two or more variable-speed compressors in fluid communication with one or more coolant circuits in thermal communication with the interior of a cooling chamber; and (ii) a switch;

whereby in use, said switch senses compressor motor current to thereby regulate supply of an available current to said two or more variable-speed compressors, so that each of said two or more variable-speed compressors is operable at a maximal speed attainable according to said available electric current.

It will be understood by the skilled addressee that solar panels are used as a source of electrical energy for the solar-powered refrigerator.

Preferably, at least two solar panels are provided per variable-speed compressor. However, it is envisaged that future advances to solar panel technology may provide solar panels of sufficient power output that only one panel may be required per variable-speed compressor.

It will be appreciated that as hereinbefore described, variable-speed compressor technology is rapidly expanding, with Danfoss A/S, Matsushita and General Electric producing a variety of such compressors, at least some of which may be suitable for the purposes of the present invention. Preferably, the variable-speed compressors are B D35F or BD50F DC compressors manufactured by Danfoss A/S Nordberg, Denmark.

More preferably, the variable-speed compressors are BD50F DC compressors.

The BD35F and BD50F variable-speed compressors are capable of speeds ranging from 2000 rpm up to a maximal speed of 3500 rpm.

Preferably, no more than three compressors are included in the solar-powered refrigerator. It is envisaged that if more than three compressors are required, a generator would be preferred to a solar power source.

Advantageously, two or three compressors are included in the solar-powered refrigerator.

Suitably, the switch senses compressor motor current. Preferably, the switch regulates compressor speed by varying an impressed reference signal (5 volt quadrangular) so that the compressor(s) operate(s) at a maximal speed attainable according to available current In use, to achieve this function, the switch varies the impressed reference signal in response to any fluctuations which are sensed in compressor motor current.

Preferably, the switch is capable of varying the impressed reference signal to thereby vary compressor speed from 2000 rpm to 3500 rpm.

Alternatively, the switch regulates supply of electric current to said compressors by varying electrical resistance.

Suitably, the coolant circuit comprises a conduit within which is located a coolant, preferably R600a or R134a coolant.

In one preferred form, the solar powered refrigerator includes a switch which regulates two variable-speed compressors, wherein a first compressor is in fluid communication with a first coolant circuit and a second compressor is in fluid communication with a second coolant circuit, each said circuit being in thermal communication with cooling panels and/or zones in the cooling chamber interior.

According to this and another preferred form to be described hereinafter, the cooling chamber is preferably cubic or box-like, the interior being bounded by peripheral walls and divided into outer cooling zones by outer cooling panels, and inner cooling zones by inner cooling panels.

Preferably, the first coolant circuit is in thermal communication with the outer cooling panels/zones while the second coolant circuit is in thermal communication with inner cooling panels/zones. This particular arrangement places each coolant circuit in thermal communication with distinct compartments of the cooling chamber interior.

In another preferred form, the solar powered refrigerator includes a switch which regulates three variable-speed compressors, wherein a first compressor is in fluid communication with a first coolant circuit, a second compressor is in fluid communication with a second coolant circuit, and a third compressor is in fluid communication with a third coolant circuit, each said circuit being in thermal communication with cooling panels and/or zones in the cooling chamber interior.

Preferably, the first coolant circuit is in thermal communication with the outer cooling panels/zones while the second and third coolant circuits are in thermal communication with inner cooling panels/zones.

It will be understood by the skilled person that independent operation of the compressors is achievable through the switch independently regulating the electric current supplied thereto.

It will also be understood that the range of available current at which each said variable-speed compressor is operable will vary. Primarily, variation will occur according to coolant temperature, which in turn is affected by ambient temperature and temperature of freezer contents. Under preferred conditions where the freezer contents have already been cooled, only a relatively small current will be required to operate the variable-speed compressors. For example, in such a situation said first compressor and said first coolant circuit are operable at a lower available current of 2–3 Amps, and the second compressor and second coolant circuit become operable at a higher available current of 6–7 Amps. In this case, the first compressor attains 3500 rpm at approximately 6–7 Amps, at which time the speed of the first compressor reduces to 2000 rpm concurrently with the second compressor becoming operable also at 2000 rpm. As available current increases to approximately 9 Amps, both compressors increase speed to 3500 rpm. In cases where a third variable-speed compressor is included, as available current increases beyond 9–10 Amps the first, second and third compressors become operable at 2000 rpm, each increasing to 3500 rpm as the available current increases.

Another factor which affects compressor operation is the nature of the compressor itself. For example, the BD50F compressor has a higher capacity and current requirement than the BD35F compressor.

DETAILED DESCRIPTION OF THE PREFERRED EMBODIMENT

Figure 1:
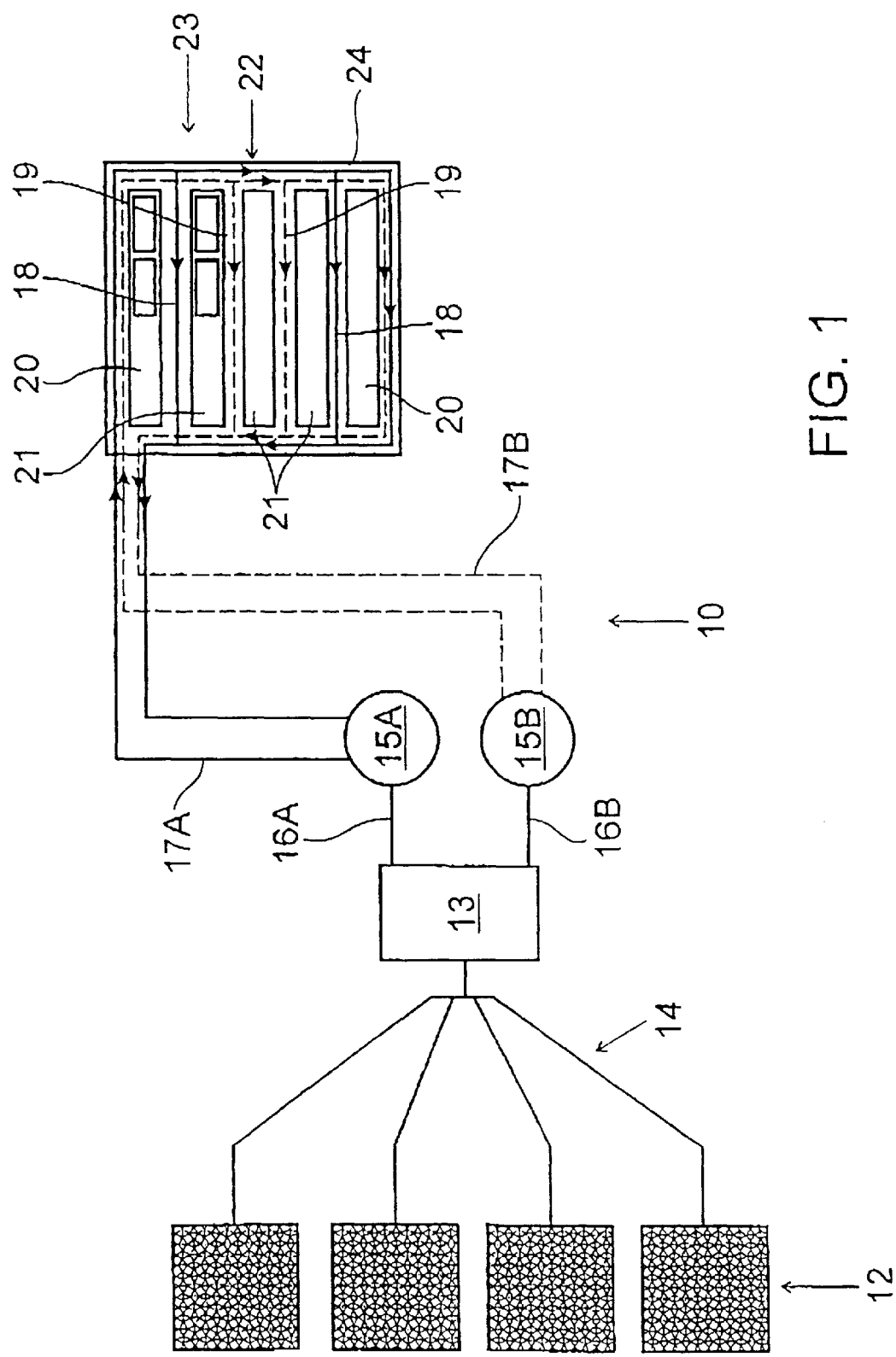
FIG. 1: Plan view of solar-powered refrigerator.

Shown in FIG. 1 is solar-powered refrigerator 10 as might be used in a remote location for the production of freezer blocks used in the transportation of vaccines.

The particular arrangement shown in FIG. 1 includes four solar panels 12 and two variable-speed compressors 15A and 15B.

Four solar panels 12 each capable of generating current up to 4.5 Amps (A) are coupled to refrigerator 10 via switch 13 and electrical circuit 14.

In use, switch 13 regulates first variable-speed compressor 15A and second variable-speed compressor 15B via electrical circuits 16A and 16B respectively so that the compressors are operable independently of each other. Each electrical circuit 16A and 16B contains both a compressor power circuit and thermostat circuit. Impressed reference signal in the thermostat circuits is regulated by switch 13.

Figure 2:
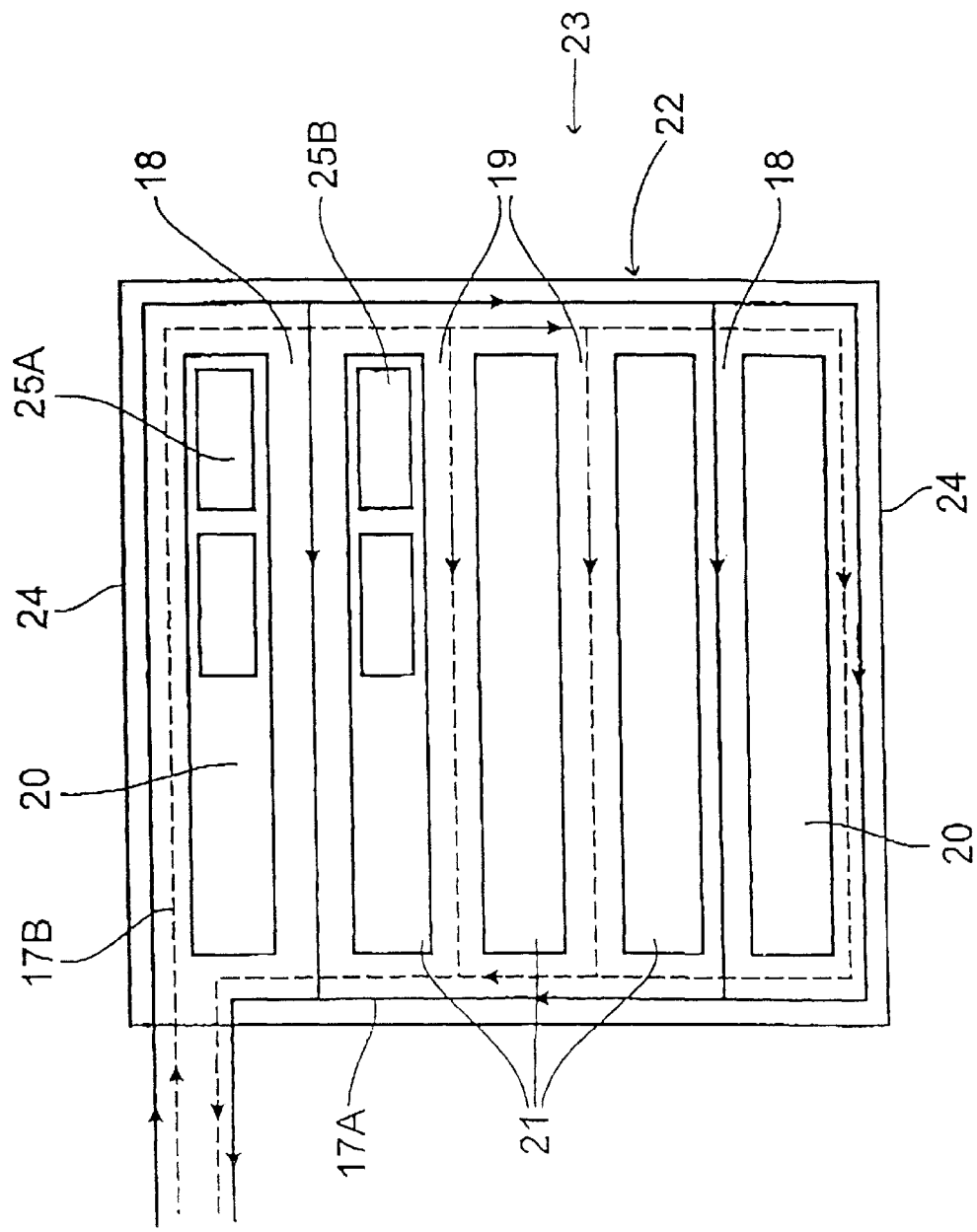
FIG. 2: Plan view of cooling chamber.

As evident in FIG. 1 and FIG. 2, coolant circuits 17A and 17B are driven by compressors 15A and 15B respectively. Each coolant circuit has a condenser (not shown), as is typical with refrigerator coolant circuits. Circuit 17A thermally communicates with outer cooling panels 18 and cooling zones 20 in interior 22 of cooling chamber 23. Circuit 17B thermally communicates with inner cooling panels 19 and cooling zones 21. Both circuits 17A and 17B also extend through peripheral walls 24 of chamber 23.

The direction of coolant flow in circuits 17A and 17B is shown by arrow heads in FIG. 1 and FIG. 2.

During operation, switch 13 regularly varies impressed reference signal while sensing compressor motor current, thereby allowing compressors 15A and 15B to attain maximum speed allowable given the available current generated by solar panels 12.

Figure 3:
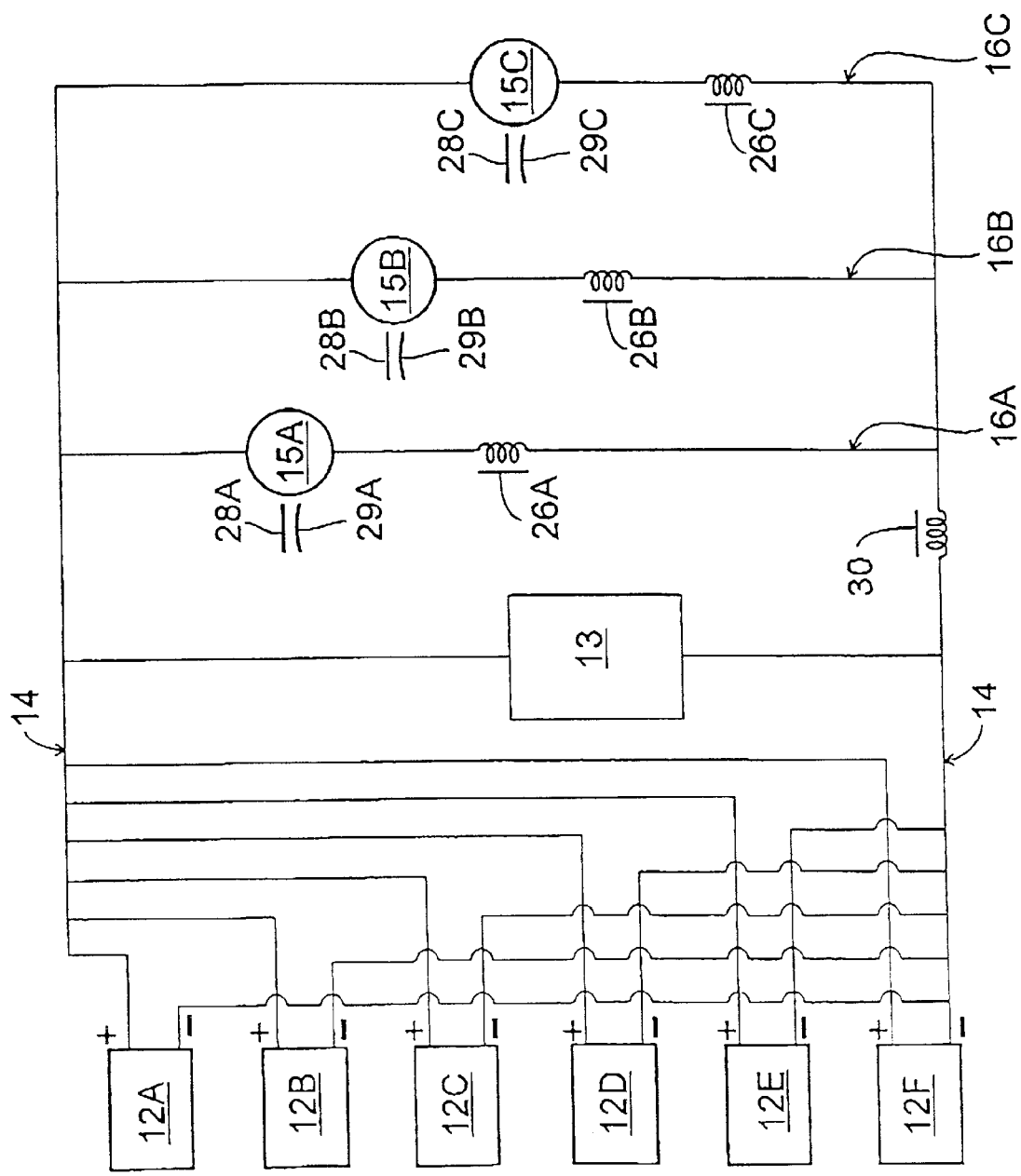
FIG. 3: Arrangement of solar panels, variable-speed compressors and switch therebetween.

Referring to FIG. 3, there is shown a detailed description of the independent operation of three variable speed compressors 15A, 15B and 15C via switch 13. It will be appreciated that the same principle applies to operation of two variable-speed compressors. Again referring to FIG. 3, six solar-panels 12A–F provide solar-generated electrical energy to compressors 15A–C under the control of microprocessor control switch 13. Hall effect sensor 26A is provided with electrical circuit 16A, Hall effect sensor 26B is provided with electrical circuit 168, and Hall effect sensor 26C is provided with electrical circuit 16C. "Total" Hall effect sensor 30 is also provided to enable measurement of total compressor current. Thermostat terminals 28 and 29 are connected to a pulse generator in switch 13.

Microprocessor control switch 13 preferably has an BKB memory capacity and includes software that provides a suitable control algorithm. It will be understood that greater memory capacity may be desirable in some circumstances. Switch 13 detects compressor current through Hall sensors 26A–C and 30 and varies impressed reference signal accordingly. Impressed reference signal controls compressor speed via respective pairs of terminals 28 and 29.

When microprocessor 13 detects solar panel output voltage, preferably at 18V it generates impressed reference signal at a frequency which allows first compressor 15A to become operable. Switch 13 then repeatedly measures current through compressor 15A via Hall sensor 26A. By comparing successive current measurements, switch 13 determines whether output is increasing from solar panels 12A–F, and if so, increases compressor 15A speed accordingly until compressor 15A reaches maximum speed. This mode of operation also allows decreases in solar panel output to decrease compressor speed. It should be noted that the aforementioned 18V output may vary according to the solar panels used, and ambient temperature which affects solar panel performance.

When compressor 15A reaches maximum speed, switch 13 alters impressed reference signal frequency so that compressors 15A and 15B operate at minimum speed. Switch 13 then controls the speed of compressors 15A and 15B by monitoring current via Hall sensors 26A and 26B respectively.

When compressors 15A and 15B reach maximum speed, switch 13 alters impressed reference signal frequency so that compressors 15A, 15B and 15C become operable at minimum speed. Switch 13 then controls the speed of compressors 15A–C by monitoring current via Hall sensors 26A, 26B and 26C and 30 respectively.

If impressed reference signal frequency is higher than that required for maximum compressor speed, and if total current sensed via Hall sensor 30 has not changed over a certain period of time, for example 15 minutes, then switch 13 changes impressed reference signal frequency back to that which allows minimum compressor speed to be achieved. Compressor speed is then controlled by switch 13 as described previously. Effectively, this is an automatic "reset" circuit controlled by software provided with switch 13 to ensure that compressor speed and current are matched appropriately.

Figure 4:
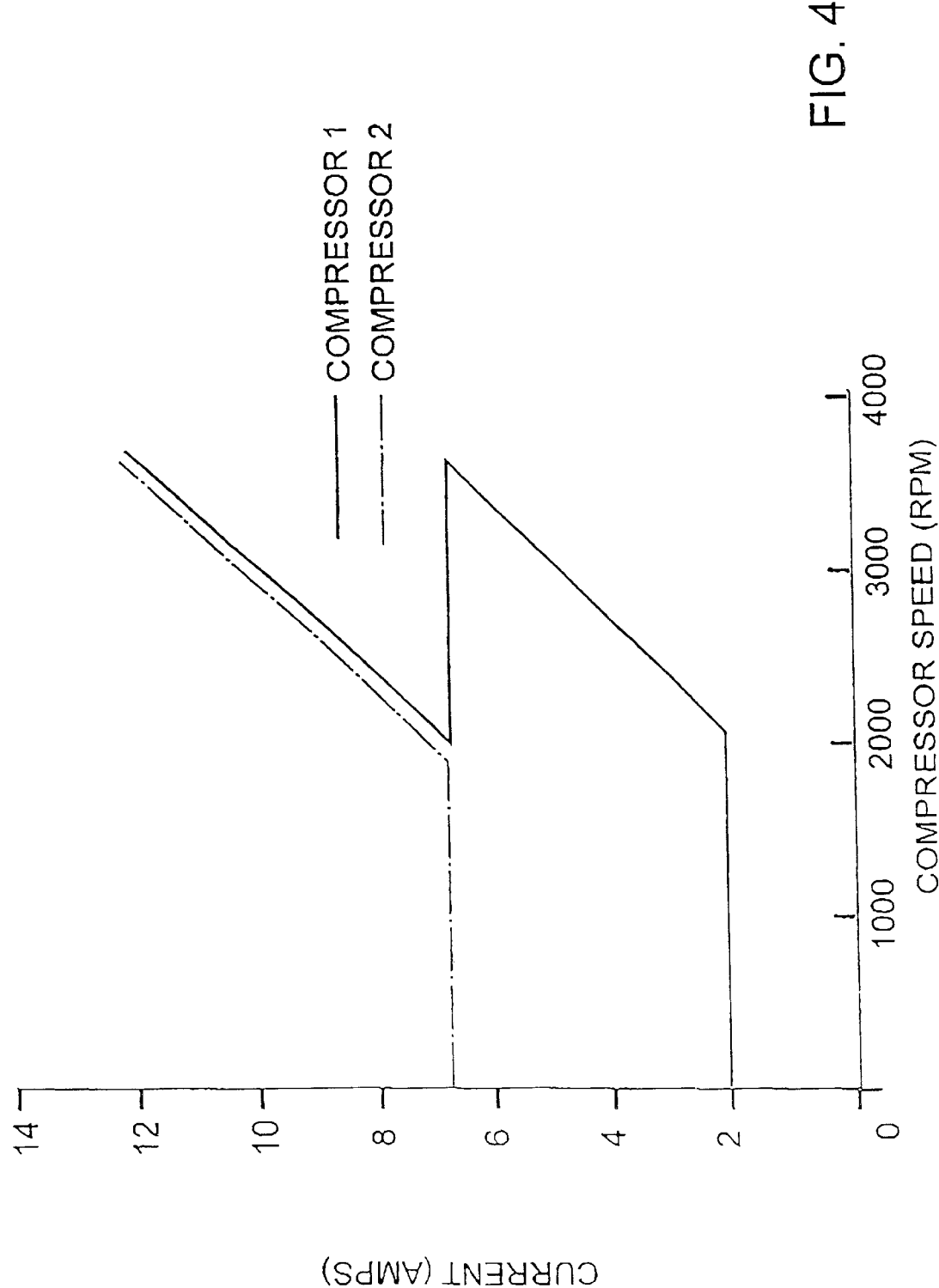
FIG. 4: Graphic representation of relationship between available current and compressor speed.

FIG. 4 illustrates a situation where solar-powered refrigerator 10 operates under conditions of relatively low current requirement. First compressor 15A begins operating at 2000 rpm when the current from solar panels 12 is 2–3 A. It will be appreciated that the amperage at which compressor operation begins increases according to coolant temperature, which in turn is affected by ambient temperature and temperature of freezer contents, such as freezer blocks 25. At this stage switch 13 maintains a required impressed reference signal sufficient to allow compressor 15A to operate at 2000 rpm.

First compressor 15A increases in speed as the current generated by solar panels 12 increases so that a maximal speed of 3500 rpm is attained, at which time switch 13 provides an appropriate impressed reference signal.

When the current has reached approximately 7 Amps, second compressor 1 SB becomes operable at 2000 rpm while correspondingly the speed of first compressor 15A is reduced to 2000 rpm. Again, as the available current increases, switch 13 maintains an appropriate impressed reference signal so that the speed of compressors 15A and 15B increases to 3500 rpm attained at a current of approximately 12 Amps.

As can be most readily seen in FIG. 2, operation of first compressor 15A preferentially cools outer cooling panels 18, outer cooling zones 20 and freezer blocks 25A contained therein. When second compressor 15B is operated, inner cooling panels 19, inner cooling zones 21 and freezer blocks 25B contained therein are cooled.

This arrangement is designed to first cool or freeze contents (in this case freezer blocks 25) located in outer cooling zones 20, as these. are most likely to have partly thawed such as during conditions of no or minimal sunlight when refrigerator 10 is not operable. The contents of inner cooling zones 21 are cooled when second compressor 15B becomes operable under conditions of higher current availability, such as when solar panels 12 receive sufficient incident solar radiation.

Thus the solar-powered refrigerator of the invention is highly adaptable in terms of refrigeration capacity and electrical energy requirements, and as such, is applicable to a wide variety of refrigeration needs.

It will also be appreciated that the solar-powered refrigerator described herein is capable of operation in the absence of a battery during periods of relatively low sunlight, in some cases under conditions of as little as 25% full sunlight. Further to this, the solar-powered refrigerator of the invention reduces the likelihood of the refrigerator contents thawing or otherwise spoiling in the absence of suitable refrigeration. An additional benefit provided by the solar-powered refrigerator of the invention is that it is readily transportable, and can be readily adapted to an on-site solar-powered energy source or can be transported with its own solar panels.

It will also be appreciated that the invention disclosed herein is not limited to the particular combination of features described in the preferred embodiment and that a variety of different embodiments are contemplated that are within the scope of the invention

What is claimed is:

1. A solar-powered refrigerator comprising:
    a cooling chamber having an interior;
    at least one coolant circuit in thermal communication with said interior of said cooling chamber;
    at least two variable-speed compressors in fluid communication with said at least one coolant circuit; and
    a switch connectable to a source of solar-generated electric current and said at least two variable-speed compressors and having means capable of sensing compressor motor current thereby to regulate supply of an available electric current to said at least two variable speed compressors, so that each of said at least two variable-speed compressors is operable at a maximal speed attainable according to said available electric current.

2. The solar-powered refrigerator of claim 1 wherein said coolant circuit is in thermal communication with cooling panels and/or zones in the cooling chamber interior.

3. The solar-powered refrigerator of claim 2 wherein the cooling chamber interior is bounded by peripheral walls and divided into outer cooling zones by outer cooling panels and inner cooling zones by inner cooling panels.

4. The solar-powered refrigerator of claim 3, wherein said variable-speed compressors are in fluid communication with respective coolant circuits, one said respective coolant circuit in thermal communication with said outer cooling panels and/or zones and another said respective coolant circuit in thermal communication with said inner cooling panels and/or zones.

5. A solar-powered refrigerator according to claim 1 which includes two variable-speed compressors.

6. The solar-powered refrigerator of claim 5 wherein a first compressor becomes operable at lower available electric current, and a second compressor becomes operable at higher available electric current.

7. The solar-powered refrigerator of claim 6 wherein said first compressor is in fluid communication with a first coolant circuit and said second compressor is in fluid communication with a second coolant circuit, each said circuit being in thermal communication with cooling panels and/or zones in the cooling chamber interior.

8. The solar-powered refrigerator of claim 7 wherein the first coolant circuit is in thermal communication with outer cooling panels and/or zones and the second coolant circuit is in thermal communication with inner cooling panels and/or zones.

9. A solar-powered refrigerator according to claim 1 which includes three variable-speed compressors.

10. The solar-powered refrigerator of claim 9 wherein a first compressor becomes operable at lower available electric current, a second compressor becomes operable at higher available electric current and a third compressor becomes operable at still higher available electric current.

11. The solar-powered refrigerator of claim 10 wherein said first compressor is in fluid communication with a first coolant circuit, said second compressor is in fluid communication with a second coolant circuit, and said third compressor is in fluid communication with a third coolant circuit, each said circuit being in thermal communication with cooling panels and/or zones in the cooling chamber interior.

12. The solar-powered refrigerator of claim 11 wherein the first coolant circuit is in thermal communication with outer cooling panels and/or zones and the second and third coolant circuit is in thermal communication with inner cooling panels and/or zones.

13. The solar-powered refrigerator of claim 1, further including at least one solar panel for each variable-speed compressor.

14. The solar-powered refrigerator of claim 13 wherein two solar panels are included for each variable-speed compressor.

15. The solar powered refrigerator of claim 5 wherein the variable-speed compressors are independently operable according to supply of electric current.

* * * * *